United States Patent
Shetty et al.

(10) Patent No.: US 10,235,235 B2
(45) Date of Patent: Mar. 19, 2019

(54) MODULAR SYSTEM AWARENESS IN VIRTUALIZED INFORMATION HANDLING SYSTEMS

(71) Applicant: Dell Products L.P., Round Rock, TX (US)

(72) Inventors: Sudhir Vittal Shetty, Cedar Park, TX (US); Matthew Christian Paul, Round Rock, TX (US); Manoj Sharad Gujarathi, Round Rock, TX (US); Mukund P. Khatri, Austin, TX (US); Damon Earley, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 15/415,615

(22) Filed: Jan. 25, 2017

(65) Prior Publication Data

US 2017/0132062 A1   May 11, 2017

Related U.S. Application Data

(63) Continuation of application No. 14/509,398, filed on Oct. 8, 2014, now Pat. No. 9,588,836.

(51) Int. Cl.
| | |
|---|---|
| G06F 11/00 | (2006.01) |
| G06F 11/07 | (2006.01) |
| G06F 11/20 | (2006.01) |
| H04L 12/24 | (2006.01) |
| G06F 9/455 | (2018.01) |
| H04L 12/46 | (2006.01) |
| G06F 11/14 | (2006.01) |

(52) U.S. Cl.
CPC ........ *G06F 11/079* (2013.01); *G06F 9/45558* (2013.01); *G06F 11/0712* (2013.01); *G06F 11/0751* (2013.01); *G06F 11/0772* (2013.01); *G06F 11/20* (2013.01); *H04L 41/065* (2013.01); *H04L 41/0659* (2013.01); *G06F 11/1484* (2013.01); *G06F 11/203* (2013.01); *G06F 2009/4557* (2013.01); *H04L 12/4641* (2013.01); *H04L 41/0631* (2013.01)

(58) Field of Classification Search
CPC .................... G06F 11/0712; G06F 11/0772
See application file for complete search history.

(56) References Cited

U.S. PATENT DOCUMENTS

| | | | |
|---|---|---|---|
| 8,060,760 | B2 | 11/2011 | Shetty |
| 9,021,097 | B2 | 4/2015 | Ashok |

(Continued)

*Primary Examiner* — Elmira Mehrmanesh
(74) *Attorney, Agent, or Firm* — Baker Botts L.L.P.

(57) ABSTRACT

Methods and systems for modular system awareness in virtualized information handling systems (IHSs) include generating, by a chassis management controller (CMC), dependency information indicating which ones of modular IHSs included in a chassis are dependent on individual shared components in the chassis. When a fault occurs at one of the shared components, the CMC may determine, using the dependency information, which particular ones of the modular IHSs are operationally dependent on the fault. The CMC may send information indicative of the fault and of the dependent modular IHSs to a virtual machine manager, which may generate a ranking of virtual machines. The virtual machine manager may use the rankings to make migration decisions for virtual machines among modular IHSs.

12 Claims, 4 Drawing Sheets

(56) References Cited

U.S. PATENT DOCUMENTS

| | | |
|---|---|---|
| 9,588,836 B2 * | 3/2017 | Shetty ................. H04L 41/0659 |
| 2006/0253633 A1 | 11/2006 | Brundridge |
| 2013/0268697 A1 | 10/2013 | Lambert |
| 2013/0268709 A1 | 10/2013 | Brundridge |
| 2014/0052309 A1 | 2/2014 | Chandrasekhar |
| 2014/0164657 A1 | 6/2014 | Chandrasekhar |
| 2014/0173072 A1 | 6/2014 | Chandrasekhar |
| 2014/0215458 A1 | 7/2014 | Devarapalli |
| 2015/0058659 A1 | 2/2015 | Brundridge |

* cited by examiner

MODULAR SYSTEM AWARENESS IN VIRTUALIZED INFORMATION HANDLING SYSTEMS

RELATED APPLICATIONS

This application is a continuation of U.S. patent application Ser. No. 14/509,398 filed Oct. 8, 2014, now U.S. Pat. No. 9,588,836 issued Mar. 7, 2017, the contents of which is incorporated by reference herein.

BACKGROUND

Field of the Disclosure

This disclosure relates generally to virtualized information handling systems, and more particularly, to modular system awareness in virtualized information handling systems.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

In a virtualized architecture, a higher level control system, often referred to as virtual machine manager (VMM), may provide management and provisioning functionality across a domain that includes multiple physical information handling systems that may each execute a plurality of VMs, such as a server rack domain in a data center. For example, a VMM may be used to allocate new VMs or transfer currently executing VMs from one physical information handling system to another physical information handling system. However, the VMM may be unaware of faults or error conditions related to the physical information handling system hardware.

SUMMARY

In one aspect, a disclosed method includes generating dependency information for a plurality of modular information handling systems included in a first modular information handling system chassis. The dependency information may specify dependency between each of the modular information handling systems and components included in the first modular information handling system chassis. When a fault occurs in the first modular information handling system chassis, the method may include determining, based on the dependency information, dependent modular information handling systems for the fault. A dependent modular information handling system may operate in dependency to a component associated with the fault.

In any embodiment, the component associated with the fault may be selected from: input/output modules, cooling system components, storage components, hardware expansion slots, networking components, backplane components, power supply components, and a modular information handling system.

In any embodiment, the method may further include changing an operating status of the dependent modular information handling systems from a first operating status to a second operating status, in response to the fault. The second operating status may be selected based on a severity of the fault. At least one of the dependent modular information handling systems may execute a hypervisor to execute virtual machines. The second operating status may indicate at least one of: no additional virtual machines allowed on a modular information handling system, no virtual machines allowed on a modular information handling system, a maximum number of virtual machines allowed on a modular information handling system, and a ranking indicating suitability for allowing new virtual machines on a modular information handling system.

In any embodiment, the method may include outputting a notification of the fault, the second operating status, and respective identifiers for the dependent modular information handling systems to a virtual machine manager. The method may include outputting the dependency information to the virtual machine manager. The virtual machine manager may interpret dependency information from a plurality of modular information handling system chassis, including the first information handling system chassis.

Another disclosed aspect includes a modular information handling system chassis, including a plurality of slots for receiving modular information handling systems and a chassis management controller including a processor having access to a memory, while the memory stores instructions executable by the processor. Another disclosed aspect includes a chassis management controller for a modular information handling system chassis. The chassis management controller may include a processor having access to a memory, while the memory stores instructions executable by the processor. Another disclosed aspect includes a virtual machine manager.

BRIEF DESCRIPTION OF THE DRAWINGS

For a more complete understanding of the present invention and its features and advantages, reference is now made to the following description, taken in conjunction with the accompanying drawings, in which.

Figure 1:
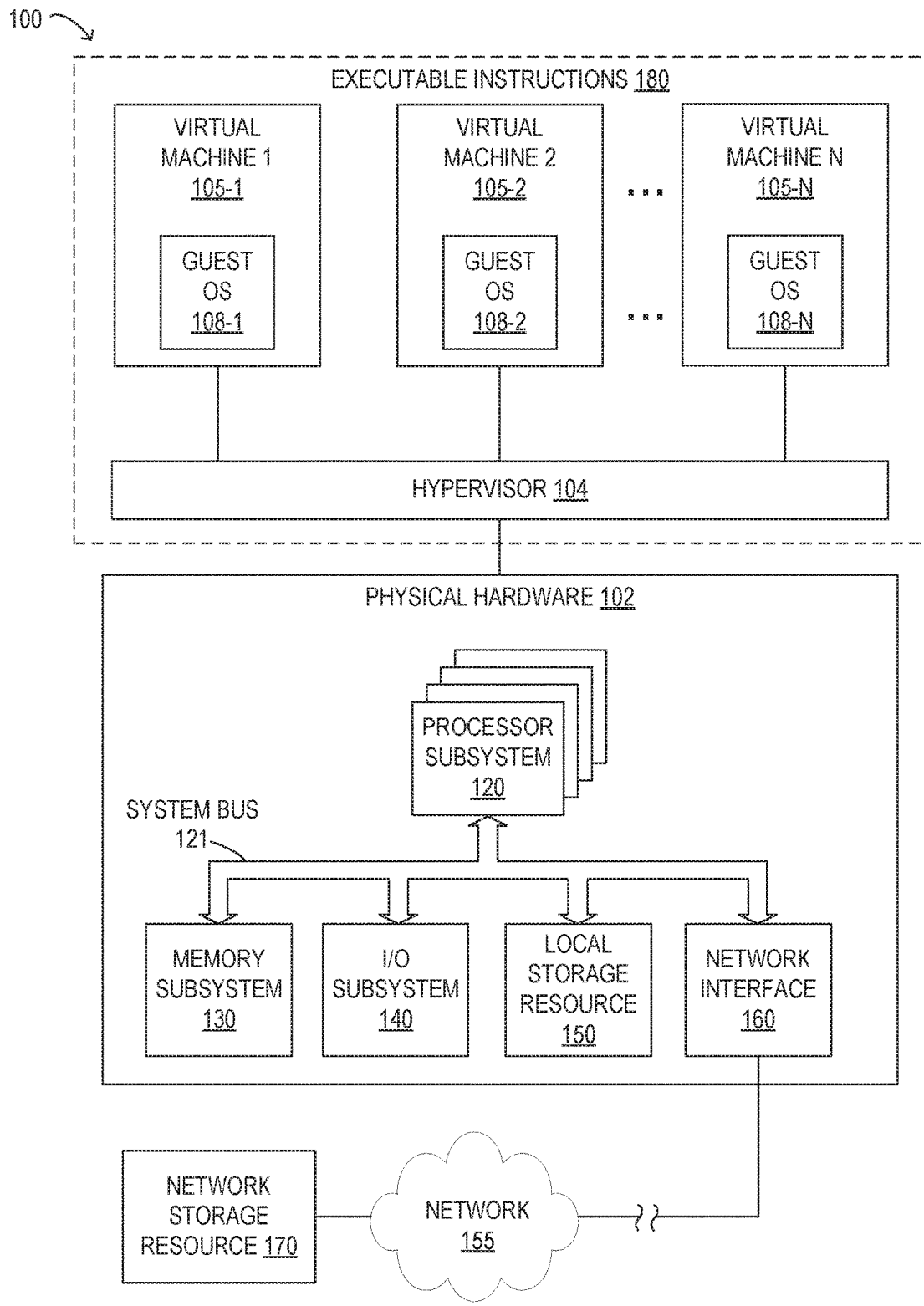
FIG. 1 is a block diagram of selected elements of an embodiment of a virtualized information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element collectively. Thus, for example, device "12-1" refers to an instance of a device class, which may be referred to collectively as devices "12" and any one of which may be referred to generically as a device "12".

As noted previously, current virtual information handling systems may be configured in domains that include pluralities of physical information handling systems at one or more data centers. The domains may include rack domains in which modular information handling systems are housed in a chassis, and multiple chassis may be housed in a rack. A rack domain may comprise large numbers of racks and chassis. Each modular information handling system may execute an instance of a hypervisor that supports execution of a plurality of virtual machines. Additionally, a virtual machine manager may provide higher level control, monitoring, optimization, and provisioning capability for the virtual machines in a rack domain. For example, the virtual machine manager may allocate and instantiate new virtual machines and may delete currently running virtual machines. The virtual machine manager may be used to evacuate certain virtual machines in the case of an error from one physical modular information handling system to another physical modular information handling system, or in other words, from one instance of a hypervisor to another instance of a hypervisor executing on a different modular information handling system.

The chassis used in a rack domain may support modular information handling systems (also referred to as blades, blade servers, computing nodes, sleds, etc.) that are installed by plugging in to corresponding backplane chassis slots. The modular chassis may support a plurality (i.e., 8, 16, 32, etc.) of the modular information handling systems. One benefit of this modular architecture is that certain components included in a chassis may be shared among the modular information handling systems installed in that chassis, such as power supplies, input/output modules, storage, cooling system components (e.g. fan blades and fan motors), and expansion slots, among others, as will be described in further detail. In this manner, the modular information handling systems may have a compact form factor and may be rapidly deployed, which is desirable.

However, conventional rack domains and virtual machine managers may be unaware of details associated with the physical topology in rack domains. When a fault, such as a memory exception, occurs in a modular information handling system, the virtual machine manager may not be aware that the fault is caused by a fault in the shared infrastructure components of the chassis in which the modular information handling system is housed. In the absence of such awareness, the virtual machine manager may erroneously evacuate virtual machines from a modular information handling system experiencing an infrastructure issue to another modular information handling system in the same chassis that is also affected by the same issue. Such erroneous evacuations may lead to poor results when the virtual machine manager is making migration decisions for virtual machines within the rack domain. For example, without awareness of faults in the shared components of the chassis, the virtual machine manager may constantly move virtual machines between modular information handling systems that are not operating normally. More generally, the virtual machine manager will not know which modular information handling systems are affected by a fault in the shared components, and as a result, will be unable to effectively make optimal migration decisions for virtual machines in the affected modular chassis.

As will be described in further detail, systems and methods for modular system awareness in virtualized information handling systems are disclosed that provide awareness of dependencies among faults and modular information handling systems. A chassis management controller (CMC) within a chassis may generate dependency information for modular information handling systems installed in the chassis and certain shared components included in the chassis. When a fault in the chassis occurs in a shared component, the chassis management controller may identify dependent modular information handling systems for the fault. The chassis management controller may take certain actions, such as changing a status, for the dependent modular information handling systems. The chassis management controller may provide information associated with the fault, as well as the dependency information, to a virtual machine manager. The virtual machine manager may use the information from the chassis management controller to make migration decisions for virtual machines. For example, the chassis management controller may generate rankings for virtual machines or modular information handling systems and may evacuate, instantiate, or migrate virtual machines based on the rankings.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, and 4, wherein like numbers are used to indicate like and corresponding parts.

Referring now to the drawings, FIG. 1 illustrates a block diagram depicting selected elements of an embodiment of system 100 for I/O acceleration using a storage virtual appliance, in accordance with the present disclosure. As depicted in FIG. 1, system 100 represents an information handling system comprising physical hardware 102, executable instructions 180 (including hypervisor 104, one or more virtual machines 105, and storage virtual appliance 110). Also shown with system 100 are external or remote elements, namely, network 155 and network storage resource 170.

As shown in FIG. 1, components of physical hardware 102 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 is a suitable system, apparatus, or device operable to serve as an interface between information handling system 100 and a network 155. Network interface 160 enables information handling system 100 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 comprises a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or another component of physical hardware 102). In the same or alternative embodiments, processor subsystem 120 may interpret and execute program instructions or process data stored remotely (e.g., in network storage resource 170).

Also in FIG. 1, memory subsystem 130 comprises a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM- CIA card, flash memory, magnetic storage, opto-magnetic storage, or a suitable selection or array of volatile or non-volatile memory that retains data after power to an associated information handling system, such as system 100, is powered down. Local storage resource 150 comprises computer-readable media (e.g., hard disk drive, floppy disk drive, CD-ROM, and/or other type of rotating storage media, flash memory, EEPROM, and/or another type of solid state storage media) and is generally operable to store instructions and data. Likewise, network storage resource 170 comprises computer-readable media (e.g., hard disk drive, floppy disk drive, CD-ROM, or other type of rotating storage media, flash memory, EEPROM, or other type of solid state storage media) and may be generally operable to store instructions and data. In system 100, I/O subsystem 140 comprises a system, device, or apparatus generally operable to receive and transmit data to or from or within system 100. I/O subsystem 140 may represent, for example, any one or more of a variety of communication interfaces, graphics interfaces, video interfaces, user input interfaces, and peripheral interfaces.

In FIG. 1, hypervisor 104 comprises software (i.e., executable code or instructions) and firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 represents a host for guest OS 108-1, virtual machine 2 105-2 represents a host for guest OS 108-2, and so on, up to virtual machine N 105-N representing a host for guest OS 108-N, where N is a desired integer having a value commensurate with the capabilities of physical hardware 102. To allow multiple operating systems to be executed on system 100 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive (i.e., disjoint or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In one embodiment, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-1 may comprise a MICROSOFT WINDOWS OS, and while another guest OS on another virtual machine (not shown) may comprise a VXWORKS OS.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104. As described below with respect to FIG. 2, physical hardware 102 may include a chassis management controller that generates dependency information between shared components of a chassis, which accommodates multiple instances of physical hardware 102, and individual instances of physical hardware 102.

Figure 2:
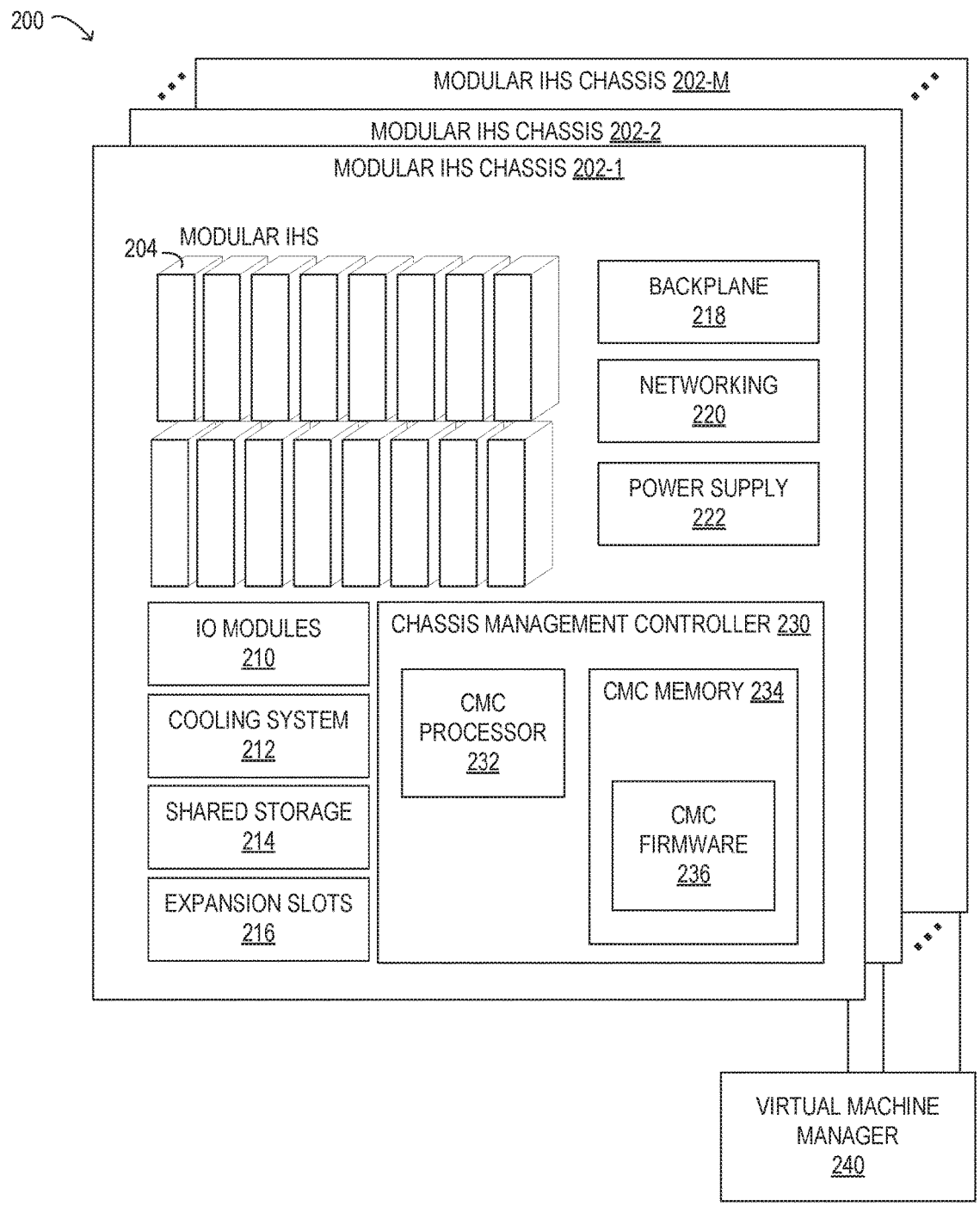
FIG. 2 is a block diagram of selected elements of an embodiment of a data center domain.

Referring now to FIG. 2, a block diagram of selected elements of an embodiment of data center domain 200 is illustrated. In FIG. 2, data center domain 200 includes a plurality of modular information handling system (IHS) chassis 202, shown as 202-1, 202-2, and so on, up to 202-M, where M is a desired integer value. In certain embodiments, data center domain 200 may be a rack domain, where modular IHS chassis 202 are housed in racks, which have been omitted from FIG. 2 for descriptive clarity. In some embodiments, modular IHS chassis 202 may represent a Dell M1000e-type chassis.

In FIG. 2, IO modules 210 may represent various IO devices, such as a keyboard, a mouse, and a video display. Cooling system 212 may include various fan blades, fan motors for air cooling, as well as components for other types of cooling, such as radiative cooling using a fluid cooling medium. Shared storage 214 may represent storage components, as well as networking and communication components to implement one or more storage fabrics, which may be internal or at least partially external to modular IHS chassis 202. Expansion slots 216 may accommodate external hardware devices, for example, PCI-E devices. Backplane 218 may support the slots for receiving modular IHSs 204, and may include backplane connectors and associated controllers for signals, data, power, or combinations thereof. Networking 220 may comprise network switches, network connections, network adapters, etc. for enabling modular IHSs 204 to connect to a network. Power supply 222 may provide modular IHS chassis 202 with various levels of direct current (DC) power from an external alternating current (AC) source, and may include redundant or hot-swappable power units.

Also, shown in FIG. 2 is chassis management controller 230, which is responsible for certain infrastructure management tasks within modular IHS chassis 202. Accordingly, chassis management controller 230 may include interfacing functionality for components included within modular IHS chassis 202. As shown, chassis management controller 230 comprises CMC processor 232 and CMC memory 234, which may store CMC firmware 236. CMC firmware 236 may represent instructions executable by CMC processor 232 to perform chassis management functions, as described herein.

Each of modular IHS chassis 202 may house a plurality of modular IHSs 204, each of which may be individual instances of information handling system 100 (see FIG. 1). Although modular IHS chassis 202 is shown housing 16 modular IHSs 204, it will be understood that modular IHS chassis 202 may provide different numbers of chassis slots (e.g., 8, 12, 16, 20, 32, etc., not shown in FIG. 2) in different embodiments, of which certain ones may be populated with modular IHSs 204 and certain ones may remain unpopulated. As shown, modular IHS chassis 202-1 may include certain shared components, including input/output (IO) modules 210, cooling system 212, shared storage 214, expansion slots 216, backplane 218, networking 220, power supply 222, and chassis management controller 230. The shared components may be shared by a subset of modular IHSs 204 installed in modular IHS chassis 202, or may be associated with certain slots in modular IHS chassis 202. For example, power supply 222 may have two sub-units that each provide power to a certain number of modular IHSs 204. Shared storage 214 may represent a storage fabric to which only certain ones of modular IHSs 204 are connected. Certain components within cooling system 212, such as individual fan blades and fan motors, may provide directed cooling to a sub-group of modular IHSs 204. Expansion slots 216 may be hardwired to be accessible only from certain designated slots for modular IHSs 204, and not from other slots that are also populated with modular IHS 204. Only certain ones of modular IHSs 204 may be connected to IO modules 210. The examples of shared components in modular IHS chassis 202 are non-limiting and other types of sharing of components in modular IHS chassis 202 may also be implemented in various embodiments. For example, a particular instance of modular IHS 204 included within modular IHS chassis 202 may provide functionality, such as embedded functionality, to support other ones of modular IHSs 204, and may thus represent a shared component.

Also depicted in FIG. 2 is virtual machine manager 240 representing a higher level control system that is enabled to manage virtual machines in a plurality of modular IHS chassis 202. In given embodiments, virtual machine manager 240 may represent an instance of VCENTER (VMWARE), the VIRT-MANAGER application (LINUX), SYSTEM CENTER VIRTUAL MACHINE MANAGER (SCVMM—Microsoft), OMNIVISTA 2500 VIRTUAL MACHINE MANAGER (Alcatel-Lucent), or FOGLIGHT FOR VIRTUALIZATION (Dell), as non-limiting examples of virtual machine managers. Among other functionality, virtual machine manager 240 may monitor instances of virtual machines among modular IHS chassis 202 and may receive information about the virtual machines from the virtual machines, or from chassis management controller 230.

In operation, chassis management controller 230 (e.g., CMC firmware 236 executed by CMC processor 232) may generate dependency information that indicates which ones of modular IHSs 204 (or virtual machines executing on particular ones of modular IHSs 204) are associated with which ones of the shared components of modular IHS chassis 202, selected from IO modules 210, cooling system 212, shared storage 214, expansion slots 216, backplane 218, networking 220, power supply 220, an instance of modular IHS 204. The dependency information may be stored in CMC memory 234. When a fault in one or more shared component occurs, chassis management controller 230 may determine, based on the dependency information, which ones of modular IHSs 204 executing on modular IHS chassis 202 are dependent upon the fault. Chassis management controller 230 may update an operating status for the dependent modular IHSs 204 from a first operating status, corresponding to an operating status prior to the fault, to a second operating status. For example, the first operating status may be 'normally operating', while the second operating status may be 'operating at reduced capacity' or another degradation in operating status. The second operating status may be selected based on a severity of the fault. The second operating status may indicate that no additional virtual machines are allowed on a modular information handling system. The second operating status may indicate that no virtual machines are allowed on a modular information handling system. The second operating status may indicate that a maximum number of virtual machines are allowed on a modular information handling system. The second operating status may indicate a ranking indicating suitability for allowing new virtual machines on a modular information handling system.

Then, chassis management controller 230 may notify virtual machine manager 240 of the fault and the dependent modular IHSs 204. Chassis management controller 230 may also send the dependency information and the second operating status to virtual machine manager 240. Then, virtual machine manager 240 may rank virtual machines executing on the dependent modular IHSs 204 accordingly and use the rankings for decisions about evacuating, instantiating, and migrating virtual machines among different modular IHS chassis 202. It is noted that, in some implementations, chassis management controller 230 may interface with a software plug-in to virtual machine manager 240 that supports the dependency information and the designation of the dependent modular IHSs 204.

Figure 3:
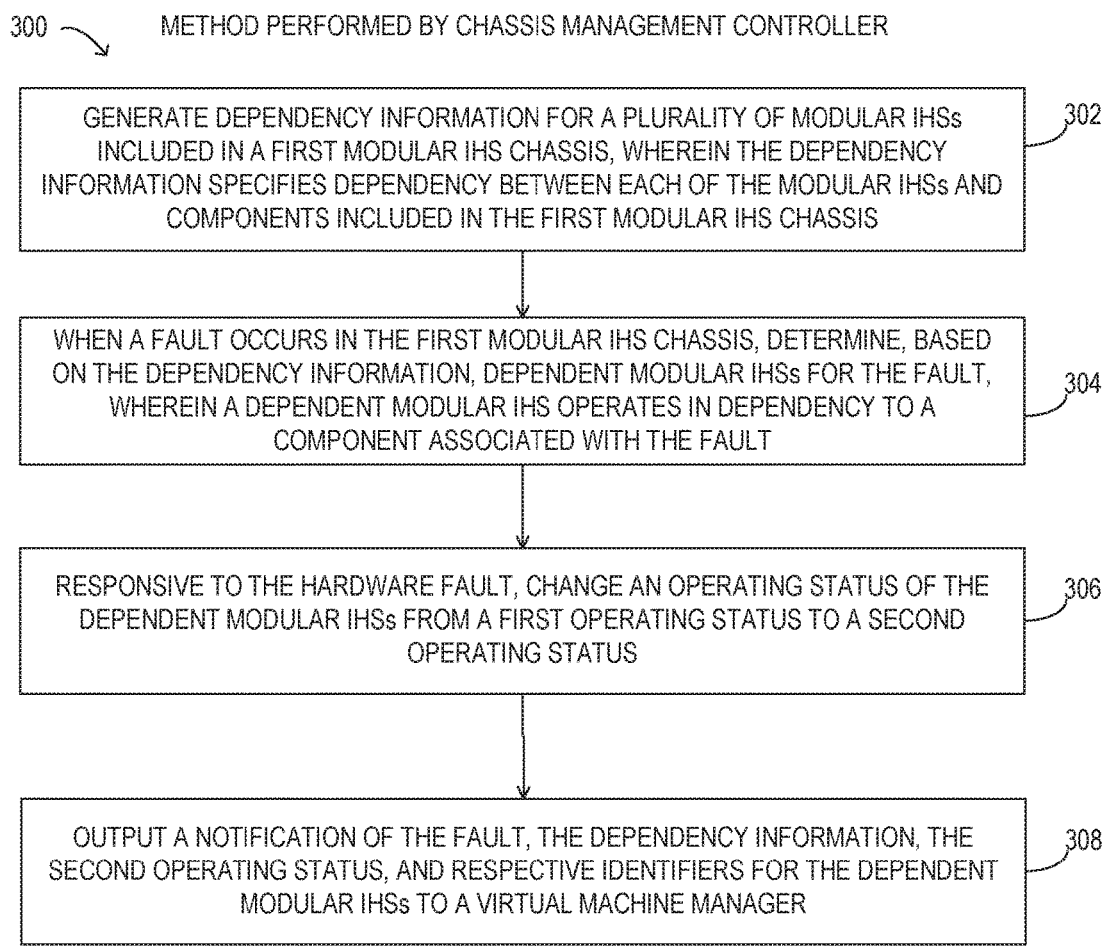
FIG. 3 is flowchart depicting selected elements of an embodiment of a method for modular system awareness in virtualized information handling systems, as described herein.

Referring now to FIG. 3, a block diagram of selected elements of an embodiment of method 300 for modular system awareness in virtualized information handling systems, as described herein, is depicted in flowchart form. Method 300 may be performed using chassis management controller 230 (see FIG. 2). It is noted that certain operations described in method 300 may be optional or may be rearranged in different embodiments.

Method 300 may begin by generating (operation 302) dependency information for a plurality of modular IHSs included in a first modular IHS chassis, wherein the dependency information specifies dependency between each of the modular IHSs and components included in the first modular IHS chassis. When a fault occurs in the first modular IHS chassis, dependent modular IHSs for the fault may be determined (operation 304) based on the dependency information, wherein a dependent modular IHS operates in dependency to a component associated with the fault. In various embodiment, the component is a shared component shared operationally by at least some of the modular IHSs operating in the first modular IHS chassis. Responsive to the fault, an operating status of the dependent modular IHSs may be changed (operation 306) from a first operating status to a second operating status. Then, a notification of the fault, the dependency information, the second operating status, and respective identifiers for the dependent modular IHSs may be output (operation 308) to a virtual machine manager. In certain embodiments, different types of information may be selectively output in operation 308. For example, the dependency information may not be output in operation 308. In some embodiments, identifiers for the virtual machines executing in the first modular IHS chassis may be output in operation 308. The virtual machine manager may manage a plurality of modular IHS chassis, including the first modular IHS chassis.

Figure 4:
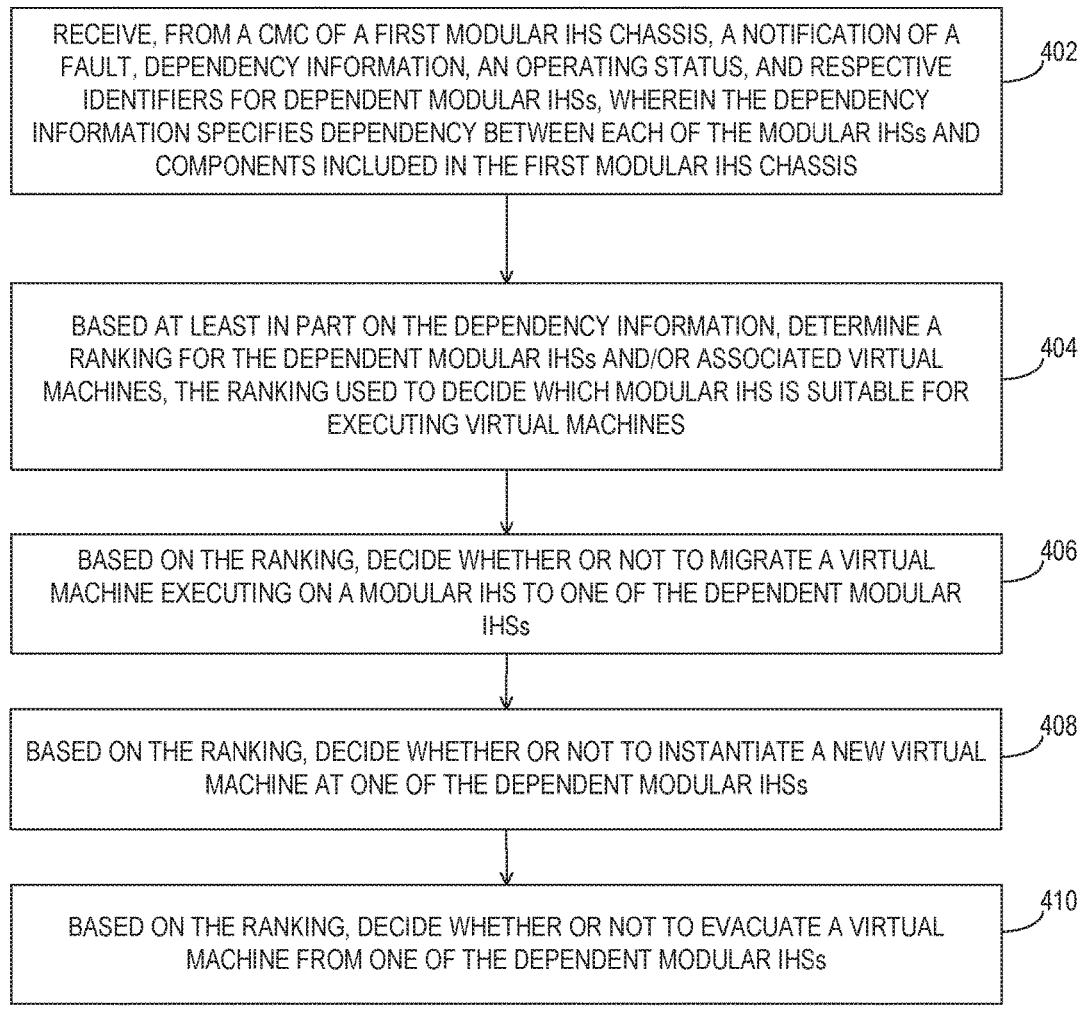
FIG. 4 is flowchart depicting selected elements of an embodiment of a method for modular system awareness in virtualized information handling systems, as described herein.

Referring now to FIG. 4, a block diagram of selected elements of an embodiment of method 400 for modular system awareness in virtualized information handling systems, as described herein, is depicted in flowchart form. Method 400 may be performed using virtual machine manager 240 (see FIG. 2). It is noted that certain operations described in method 400 may be optional or may be rearranged in different embodiments.

Method 400 may begin by receiving (operation 402), from a chassis management controller of a first modular IHS chassis, a notification of a fault, dependency information, an operating status, and respective identifiers for dependent modular IHSs, wherein the dependency information specifies dependency between each of the modular IHSs and components included in the first modular IHS chassis. In certain embodiments, the dependency information may be omitted in operation 402. Based at least in part on the dependency information, a ranking for the dependent modular IHSs and/or associated virtual machines may be determined (operation 404), the ranking used to decide which modular IHS is suitable for executing virtual machines. Based on the ranking, method 400 may include deciding (operation 406) whether or not to migrate a virtual machine executing on a modular IHS to one of the dependent modular IHSs. Based on the ranking, method 400 may include deciding (operation 408) whether or not to instantiate a new virtual machine at one of the dependent modular IHSs. Based on the ranking, method 400 may include deciding (operation 410) whether or not to evacuate a virtual machine from one of the dependent modular IHSs.

As described in detail herein, disclosed methods and systems for modular system awareness in virtualized information handling systems (IHSs) include generating, by a chassis management controller (CMC), dependency information indicating which ones of modular IHSs included in a chassis are dependent on individual shared components in the chassis. When a fault occurs at one of the shared components, the CMC may determine, using the dependency information, which particular ones of the modular IHSs are operationally dependent on the fault. The CMC may send information indicative of the fault and of the dependent modular IHSs to a virtual machine manager, which may generate a ranking of virtual machines. The virtual machine manager may use the rankings to make migration decisions for virtual machines among modular IHSs.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A modular information handling system chassis, comprising:
    a plurality of slots for receiving modular information handling systems; and
    a chassis management controller comprising a processor having access to a memory, wherein the memory stores instructions executable by the processor to:
        generate dependency information for a plurality of modular information handling systems included in a first modular information handling system chassis, wherein the dependency information indicates which ones of the modular information handling systems are respectively associated with components included in the first modular information handling system chassis;
        when a fault occurs in the first modular information handling system chassis, determine, based on the dependency information, dependent modular information handling systems for the fault, wherein a dependent modular information handling system operates in dependency to a component associated with the fault;
        responsive to the fault, change an operating status of the dependent modular information handling systems from a first operating status to a second operating status; and
        output a notification of the fault, the second operating status, and respective identifiers for the dependent modular information handling systems to a virtual machine manager.

2. The modular information handling system chassis of claim 1, wherein the second operating status is selected based on a severity of the fault.

3. The modular information handling system chassis of claim 1, wherein at least one of the dependent modular information handling systems executes a hypervisor to execute virtual machines, and wherein the second operating status indicates at least one of:
- no additional virtual machines allowed on a modular information handling system;
- no virtual machines allowed on a modular information handling system;
- a maximum number of virtual machines allowed on a modular information handling system; and
- a ranking indicating suitability for allowing new virtual machines on a modular information handling system.

4. The modular information handling system chassis of claim 1, further comprising instructions to:
- output the dependency information to the virtual machine manager.

5. The modular information handling system chassis of claim 4, wherein the virtual machine manager interprets dependency information from a plurality of modular information handling system chassis, including the first information handling system chassis.

6. The modular information handling system chassis of claim 1, wherein the component associated with the fault is selected from:
- input/output modules;
- cooling system components;
- storage components;
- hardware expansion slots;
- networking components;
- backplane components;
- power supply components; and
- a modular information handling system.

7. A chassis management controller for a modular information handling system chassis, the chassis management controller comprising:
- a processor having access to a memory, wherein the memory stores instructions executable by the processor to:
  - generate dependency information for a plurality of modular information handling systems included in a first modular information handling system chassis, wherein the dependency information indicates which ones of the modular information handling systems are respectively associated with components included in the first modular information handling system chassis;
  - when a fault occurs in the first modular information handling system chassis, determine, based on the dependency information, dependent modular information handling systems for the fault, wherein a dependent modular information handling system operates in dependency to a component associated with the fault;
  - responsive to the fault, change an operating status of the dependent modular information handling systems from a first operating status to a second operating status; and
  - output a notification of the fault, the second operating status, and respective identifiers for the dependent modular information handling systems to a virtual machine manager.

8. The chassis management controller of claim 7, wherein the second operating status is selected based on a severity of the fault.

9. The chassis management controller of claim 7, wherein at least one of the dependent modular information handling systems executes a hypervisor to execute virtual machines, and wherein the second operating status indicates at least one of:
- no additional virtual machines allowed on a modular information handling system;
- no virtual machines allowed on a modular information handling system;
- a maximum number of virtual machines allowed on a modular information handling system; and
- a ranking indicating suitability for allowing new virtual machines on a modular information handling system.

10. The chassis management controller of claim 7, further comprising instructions to:
- output the dependency information to the virtual machine manager.

11. The chassis management controller of claim 10, wherein the virtual machine manager interprets dependency information from a plurality of modular information handling system chassis, including the first information handling system chassis.

12. The chassis management controller of claim 7, wherein the component associated with the fault is selected from:
- input/output modules;
- cooling system components;
- storage components;
- hardware expansion slots;
- networking components;
- backplane components;
- power supply components; and
- a modular information handling system.

* * * * *